June 27, 1967  C. A. BALCHUNAS  3,328,570
ILLUMINATED PANEL MEMBER
Filed April 2, 1965  2 Sheets-Sheet 1
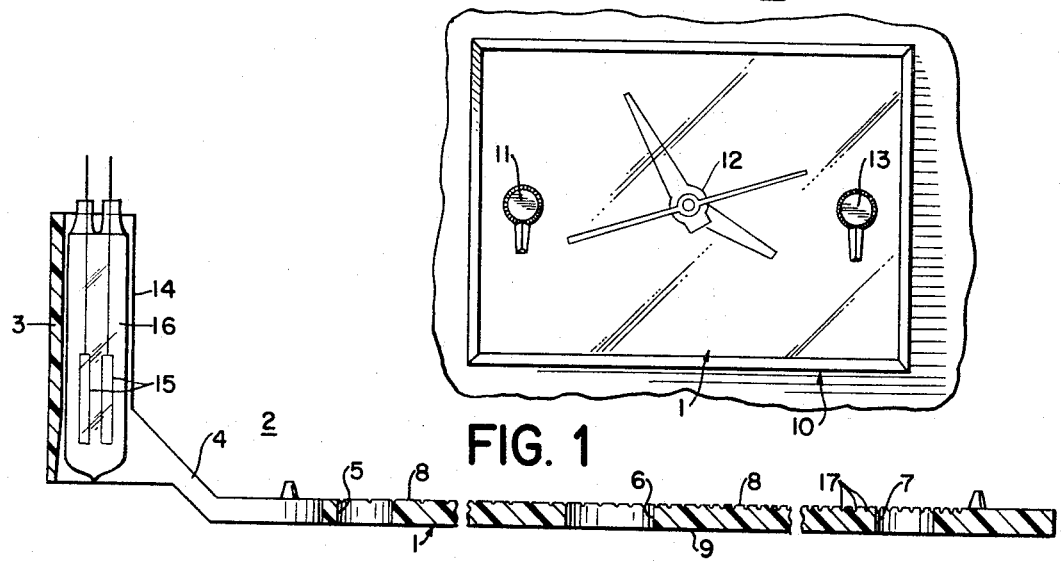
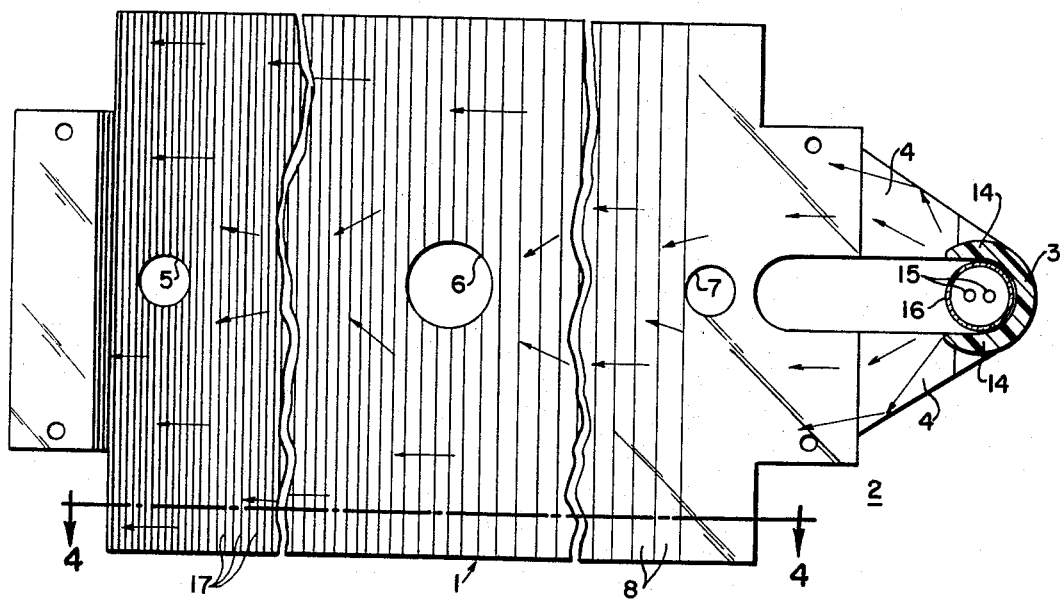
INVENTOR.
CHARLES A. BALCHUNAS
BY
HIS ATTORNEY

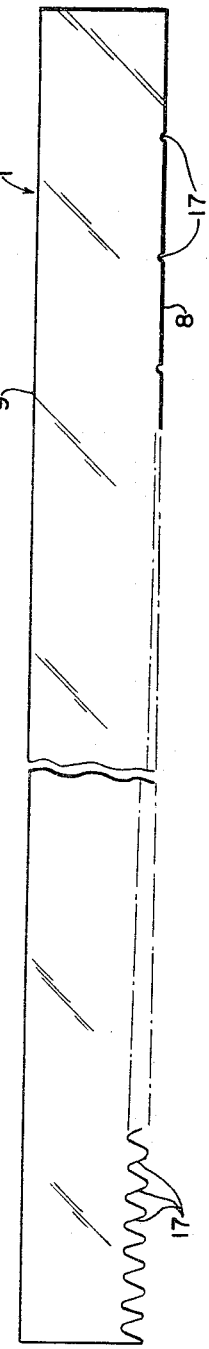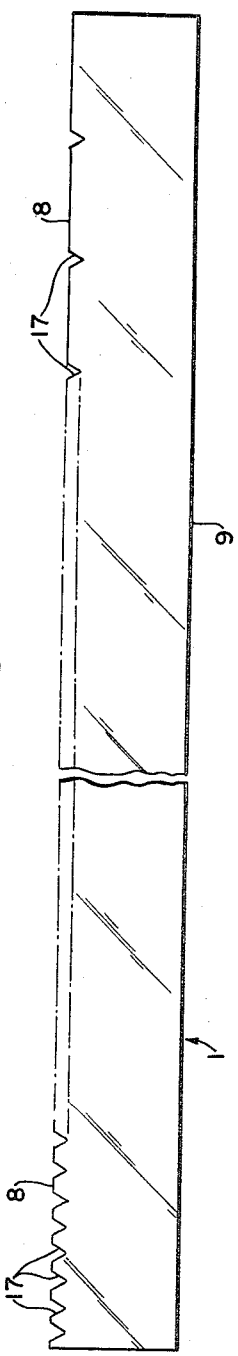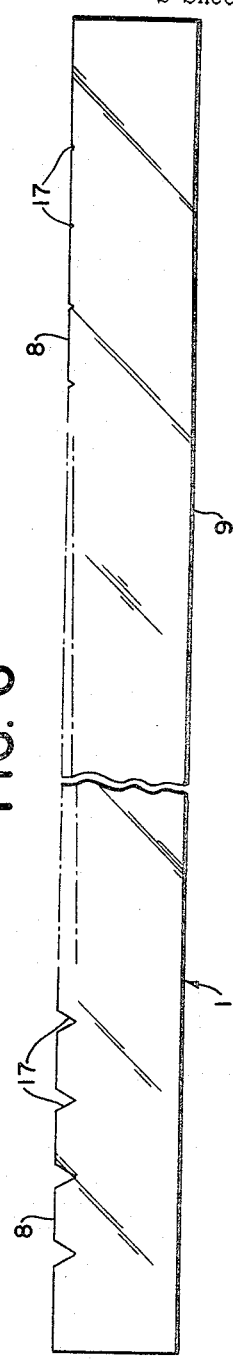

United States Patent Office 3,328,570
Patented June 27, 1967

3,328,570
ILLUMINATED PANEL MEMBER
Charles A. Balchunas, Hopkinton, Mass., assignor to General Electric Company, a corporation of New York
Filed Apr. 9, 1965, Ser. No. 446,819
1 Claim. (Cl. 240—2.1)

ABSTRACT OF THE DISCLOSURE

This disclosure is directed to an improved light distributing panel 1 for a timer dial. Three openings, 5, 6 and 7 are formed in the panel for receiving clock hand shafts and timer control shafts. A U-shaped lamp holder 3 is joined with the panel 1 through a bifurcated light transmitting member 4 and an elongated slot extends through the panel member 1 in line with the openings 5, 6 and 7. A plurality of spaced parallel grooves 17 are formed in the panel. The grooves have an increasingly shorter distance therebetween and extend deeper into the panel member as their distance from the light source increases in order to maintain a uniform level of illumination over the entire panel member.

---

My invention relates to illuminating means, and more particularly, to illuminating means for a panel member of an indicator device.

It is known to provide a means for edge lighting panel members of indicating devices so that the source of illumination is located at an edge of the panel member and is concealed from direct view. The light rays from this source are conducted by a number of internal reflections through a surface of the panel member and only emerge as visible light when a reflecting surface or an irregularity is encountered in a surface of the panel member. In the prior art appreciable difficulty has been experienced in attempting to provide a panel member with a uniform illumination and in attempting to eliminate a shadow on the panel member caused by indicator shafts, etc. passing therethrough. Thus, the previously used panel members have required more than one illuminating source or have utilized various supplemental reflecting means in an attempt to overcome these difficulties.

It is an object of my invention to provide an improved illuminating indicator device wherein a uniform level of illumination is maintained over an entire panel member by the provision of features whch recognize the decrease in light intensity in portions of the panel member further from a source.

It is a further object of my invention to provide an improved panel member wherein a uniform level of illumination is maintained in spite of shafts passing through its surfaces.

It is another object of my invention to provide an illuminating indicator device which is simple to construct and is inexpensive to manufacture because it utilizes simple light scattering and reflecting elements.

In accordance with one aspect of my invention, a plurality of grooves on a surface of a panel member effect a uniform level of illumination over the entire surfaces of the panel member. The grooves intercept light rays transmitted from a light source and reflect and scatter light rays throughout the panel member, causing them to be transmitted through the surfaces of the panel member. A uniform level of illumination is maintained by increasing the reflecting and scattering area provided by the grooves per unit of area of the panel member in accordance with a predetermined mathematical relationship based on the inverse-square law of light transmittance.

FIG. 1 is a sectional view of the illuminating indicator device utilizing the illuminated panel member made in accordance with a preferred embodiment of my invention;

FIG. 2 is a front view of a timer utilizing the illuminated panel member of my invention;

FIG. 3 is a top view of the illuminating indicator device utilizing the illuminated panel member made in accordance with a preferred embodiment of my invention;

FIG. 4 is an enlarged sectional view taken along the line 4—4 of FIG. 3;

FIG. 5 is a top view of a panel member made in accordance with a first embodiment of my invention;

FIG. 6 is a top view of a panel member made in accordance with a second embodiment of my invention.

FIG. 1 illustrates one embodiment of my invention wherein a light transmitting panel member 1 comprises a portion of an illuminating indicator device 2. The surface area of the panel member 1 may be rectangular as shown in the preferred embodiment of my invention. A lamp retaining device such as a U-shaped lamp holder 3 is joined with the panel member 1 through a bifurcated light transmitting means 4 which comprises a support member for the lamp holder. While in this embodiment of my invention the light transmitting means 4 is integral with the lamp holder 3 and the panel holder 1, the light transmitting means 4 may be a separate member therefrom. The panel member 1 may be formed of glass or any plastics which are normally employed in indicator devices such as the edge lighted indicator device 2. The panel member 1 may have a number of openings indicated at 5, 6, and 7 extending through the surfaces 8 and 9.

If the illuminating indicator device is used as a dial face illuminator for a clock, such as clock 10 shown in FIG. 2, a number of shafts may pass through the openings 5, 6, and 7 for use with the control knobs 11 and 13 and the clock time indicating mechanism 12. In order to provide a path for light rays from the lamp holder 3 to the panel member 1 which is not in line with the openings 5, 6, and 7, each of the arms 14 of the U-shaped lamp holder 3 extends toward the panel member 1 and is attached to the edge of the panel member 1 by one of the two sections of the bifurcated light transmitting means 4. The light rays are transmitted from a light source 15 of a lamp 16, retained by the lamp holder 3, and through the light transmitting means 4 to the panel member 1. Thus the light rays are transmitted to the panel member 1 in the form of a pair of line sources of light. The lamp holder 3 when mounted in this manner eliminates a hot spot or intense source of light. Therefore, any shafts which may pass through the openings 5, 6, and 7 do not block the light rays transmitted from the light source 15.

Referring to FIGS. 1, 3, and 4, a plurality of grooves 17 are located on a surface of the panel member 1 to intercept light rays as they pass through the panel member 1 and to reflect the light from the surface area provided by the grooves and scatter the light rays throughout the panel member. The reflection and scattering caused by the grooves diffuses the light rays over the entire panel member 1, as shown by the arrows in FIG. 3, so that even the portions of the panel members 1 which are not aligned with the light transmitting means 4 receive light rays from the light source 15. Furthermore, the grooves reflect the light rays through the surfaces 8 and/or 9 so that if one of these comprises a front surface of a clock's dial face it is visible to an observer. The grooves may be parallel to each other as shown in the preferred embodiment of my invention, but they need only be inscribed in a surface of the panel member as described below. They may be inscribed on either or both of the surfaces 8 and 9 of the panel member 1.

It has been found that the percentage of the light passing by a given groove which is reflected and scattered by the groove is proportional to the surface area provided by the groove. In order to provide a uniform level of illumination over the surfaces 8 and 9 of the panel member 1, the amount of light reflected through any unit area of the surfaces of the panel member 1 must be equal. Therefore, the surface 8 is provided with the grooves 17 formed by inscribing or otherwise in such a manner that they will cause an equal illumination per unit area over the entire surface of the panel member. When light rays are transmitted from a light source 15, through the light transmitting means 4 and through the panel member 1, the intensity of the light rays decreases in accordance with the inverse-square law of light transmittance, as the distance between the light source 15 and the advancing front of light rays increases. Therefore, as the distance between the source and a given groove increases, the intensity of the light passing the groove decreases with the square of this distance. Thus in comparing two spaced unit areas of the panel member 1, wherein the mean point of a first unit area is further from the light source than the mean point of a second unit area, the first unit area has a lesser intensity of light transmitted past it than does the second. This lesser intensity of light occurs in proportion to the difference between the squares of the distance between the light source and the mean points of the first and second unit areas.

In accordance with one aspect of my invention, the reflecting and scattering area provided by the grooves per unit area of the panel member is increased in accordance with a predetermined mathematical relationship, based upon the inverse-square law of light transmittance. Thus as the intensity of the light decreases when the light passes through the panel member in a direction away from the light source, a higher percentage of the lighting passing a unit area is reflected and scattered since the reflecting and scattering area provided by the grooves per unit area of the panel member 1 is increased accordingly.

One means of increasing the reflecting and scattering area provided by the grooves is by forming the grooves closer together as the distance between the light source and the grooves increases, in accordance with a quasi-logarithmic mathematical relationship based upon the inverse-square law of light transmittance. This embodiment of my invention is shown in FIG. 5. As the distance from the mean points of given unit areas and the light source increases, the number of grooves per unit area increases with the square of this distance. Thus, the percentage of light reflected and scattered by the grooves increases in proportion with the decrease in the intensity of the light passing the unit area. Therefore, the level of illumination remains uniform over the surfaces 8 and 9 of the panel member 1.

One method of determining the distances between adjacent grooves in accordance with my invention is to calculate the number of grooves needed per unit area of the panel member 1 so as to maintain a constant level of illumination over the surfaces of the panel member. Where E is a unit of illumination, I is a unit of intensity of the source calculated in horizontal candle power, and D is the distance from the source to a perpendicular light-receiving plane, the formula for light transmittance is:

$$E = \frac{I}{D^2} \quad (1)$$

For a first unit area of the panel member, it may be found by empirical methods that a number of spaced grooves $N_1$ is needed to provide a uniform level of illumination. The distance between the light source 15 and a perpendicular from the mean point of the first unit area is $D_1$. Now a second unit area has a distance $D_2$ between its mean points and the light source 15. The number of grooves $N_2$ for the second unit area is calculated as follows. Since the illumination E is to be constant over both unit areas, and the intensity of the source I is the same for each unit area, $$E = \frac{N_1 I}{(D_1)^2} = \frac{N_2 I}{(D_2)^2} \quad (2)$$

$$N_2 = N_1 \frac{(D_2)^2}{(D_1)^2} \quad (3)$$

Thus the requisite number of grooves needed to maintain a uniform level of illumination in a unit area may be calculated for any unit area of the panel member. By calculating the number of grooves needed per unit area for adjacent and overlapping unit areas, a graduated scale can be set up showing the number of lines required along a perpendicular line from the light source 15 for a uniform illumination over the entire panel member. From this scale the distance between adjacent grooves can be closely approximated so as to graduate this distance in accordance with the number of grooves needed per unit area of the panel member. Since the number of grooves needed per unit area is determined in accordance with the inverse-square law of light transmittance, the distance between these grooves varies in like manner.

Another means of increasing the reflecting and scattering area provided by the grooves per unit area of the panel member 1 is a surface 8 provided with grooves which extend increasingly deeper into the panel member 1 as the distance between the grooves and the light source 15 increases. This embodiment of my invention is shown in FIG. 6. By increasing the depth of the grooves in accordance with a predetermined quasi-logarithmic mathematical relationship based upon the square of the distance between the mean points of a unit area containing the grooves and the light source 15, the reflecting and scattering area of the grooves is increased in proportion to the decrease in the intensity of the light transmittance past the unit area. Thus, the level of illumination remains uniform over the surfaces 8 and 9 of the panel member 1. The increasing depth may be calculated as described above with respect to the first embodiment of my invention.

A further means of increasing the reflecting and scattering area provided by the grooves 17 per unit area of the panel member 1 is a surface 8 inscribed with grooves in a manner combining the two means described above. That is the grooves both have an increasingly shorter distance therebetween and extend increasingly further into the panel member as the distance between the light source and the grooves increases. A panel member formed in this manner is illustrated in the preferred embodiment of my invention shown in FIGS. 1, 3, and 4. Thus the grooves both have an increasingly shorter distance therebetween and extend further into the panel member 1 with a predetermined quasi-logarithmic mathematical relationship based upon the square of the distance between the mean points of unit areas containing the grooves 17 and the light source 15.

This last described means is used when for a particular level of illumination it is physically impractical to increase the number of lines per unit area of the panel member to the number needed to provide uniform illumination. For example, where the distance from the mean point of a first unit area to the source is ten times larger than the distance from the mean point of a second unit area which is used as a reference for the illumination level, one hundred times as many lines are required in the first unit area as are contained in the second. And thus the distance between adjacent grooves becomes proportionally shorter in accordance with my invention. By extending the grooves deeper into the panel member, proportionally fewer lines are needed in the first unit area to maintain a uniform illumination level.

In operation, light rays are transmitted from the light source 15 in the lamp 16 and through each section of the bifurcated light transmitting means for one edge of the panel member 1. The light rays are transmitted through the panel member 1 where they are reflected and scattered by the grooves 17, as shown by the arrows in FIG. 3, so that they are spread throughout the panel member 1 and are seen by an observer who is looking at either of the surfaces 8 or 9. By varying the reflecting and scattering area provided by the grooves in accordance with the mathematical relationship based upon the inverse-square law of light transmittance, a larger percentage of the light transmitted past a given unit area of surfaces 8 and 9 of the panel member 1 is reflected and scattered in proportion to the decreases in the illumination as the light rays travel farther from the source 15. Thus, a uniform level of illumination is maintained over the surfaces 8 and 9 of the panel member 1.

My invention is not limited to the embodiments shown herein or to the specific apparatus discussed above. To the contrary, my invention is capable of numerous modifications as will be recognized by those skilled in the art, without deviating from the scope thereof and should not be limited in any sense except as defined by the following claim.

I claim:
An illuminating indicator device comprising:
(a) a light transmitting panel member having front and rear face surfaces,
(b) three openings in line with each other extending through the front and rear surfaces of said light transmitting panel member, the center opening having an opaque clock hand shaft positioned therein, and the other openings having opaque control knob shafts positioned therein;
(c) a generally U-shaped lamp holder elongated in a direction perpendicular to said front and rear surfaces of said panel member, the arms of said U-shaped lamp holder extending toward said panel member and the lamp holder being in line with said plurality of openings;
(d) a lamp positioned in said lamp holder, said lamp being in line with said plurality of openings;
(e) an elongated slot open at the front and rear surfaces extending through the front and rear surfaces of said panel member, said slot being in line with said plurality of openings;
(f) means for transmitting light rays from said lamp to said panel member and through said panel member in a direction generally parallel to the surfaces of said panel member, said light rays transmitting means including a pair of bifurcated transmitting members extending outwardly from the arms of said U-shaped member, the light rays from said light source being directed by said bifurcated members through said panel so as to prevent hot spots of light in front of said openings;
(g) said pair of transmitting members extending outwardly from the arms of said U-shaped member and towards said panel member to integrally connect said lamp holder and said panel member;
(h) a plurality of spaced grooves on said first surface of said panel member to intercept the light rays transmitted from said transmitting means to said panel member, said grooves reflecting and scattering the light rays throughout said panel member and causing them to be transmitted from said surfaces of said panel member;
(i) said grooves having an increasingly shorter distance therebetween as the distance between the light source and said grooves increases, and said grooves extending increasingly deeper into said panel member as the distance between the light source and said grooves increases;
(j) said grooves both having an increasingly shorter distance therebetween and extending deeper into said panel member in accordance with a predetermined mathematical relationship as the distance between the light source and said grooves increases so that as the light transmitted through said panel member and past said grooves decreases in accordance with the inverse-square law of light transmittance a higher percentage of the light transmitted is reflected and scattered so as to maintain a uniform level of illumination over the entire panel member.

References Cited

UNITED STATES PATENTS

| 2,745,946 | 5/1956 | Pretzmann | 240—1 |
| 3,043,947 | 7/1962 | Albinger | 240—1 |
| 3,228,288 | 1/1966 | Marien | 240—1 |

FOREIGN PATENTS

| 664,193 | 1/1952 | Great Britain. |
| 465,376 | 8/1951 | Italy. |

NORTON ANSHER, *Primary Examiner.*

D. L. JACOBSON, *Assistant Examiner.*